United States Patent
Carlbom et al.

(10) Patent No.: US 9,476,987 B2
(45) Date of Patent: Oct. 25, 2016

(54) METHOD ESTIMATING ABSOLUTE ORIENTATION OF A VEHICLE

(75) Inventors: Pelle Carlbom, Linköping (SE); Thomas Beckman, Linköping (SE); Ulf Erlandsson, Onsala (SE)

(73) Assignee: SAAB AB, Linköping (SE)

( * ) Notice: Subject to any disclaimer, the term of this patent is extended or adjusted under 35 U.S.C. 154(b) by 1044 days.

(21) Appl. No.: 13/511,073

(22) PCT Filed: Nov. 20, 2009

(86) PCT No.: PCT/SE2009/000497
§ 371 (c)(1),
(2), (4) Date: Sep. 19, 2012

(87) PCT Pub. No.: WO2011/062525
PCT Pub. Date: May 26, 2011

(65) Prior Publication Data
US 2013/0004086 A1   Jan. 3, 2013

(51) Int. Cl.
G06K 9/62 (2006.01)
G01S 19/14 (2010.01)
G06T 7/00 (2006.01)
G01S 5/16 (2006.01)

(52) U.S. Cl.
CPC ............... *G01S 19/14* (2013.01); *G01S 5/163* (2013.01); *G06T 7/0042* (2013.01); *G06T 2207/10016* (2013.01); *G06T 2207/20164* (2013.01); *G06T 2207/30244* (2013.01)

(58) Field of Classification Search
CPC ..... G01S 19/14; G01S 5/163; G06T 7/0042; G06T 2207/20164; G06T 2207/30244; G06T 2207/10016
See application file for complete search history.

(56) References Cited

U.S. PATENT DOCUMENTS

| 5,647,015 A | 7/1997 | Choate et al. |
| 5,894,323 A | 4/1999 | Kain et al. |
| 2006/0018642 A1 | 1/2006 | Chaplin |

(Continued)

FOREIGN PATENT DOCUMENTS

| EP | 0431191 A1 | 6/1991 |
| EP | 1898181 A1 | 3/2008 |

(Continued)

OTHER PUBLICATIONS

Davison et al., "MonoSLAM: Real-Time Single Camera SLAM", Jun. 2007, IEEE Trans. on Pattern Analysis and Machine Intelligence, vol. 29, No. 6, p. 1052-1067.*

(Continued)

*Primary Examiner* — Stephen R Koziol
*Assistant Examiner* — Timothy Choi
(74) *Attorney, Agent, or Firm* — Venable LLP; Jeffri A. Kaminski

(57) ABSTRACT

A method of estimating absolute orientation of a vehicle utilizing a camera and GPS. At least three images are selected from concurrent images taken above an essentially horizontal ground at a distance from each other. Key points are identified in each selected image. Absolute positions of the images are obtained from the GPS defining the image positions when a respective image was taken. Key points between selected images are matched to obtain an estimate of the absolute orientation.

2 Claims, 2 Drawing Sheets

(56) References Cited

U.S. PATENT DOCUMENTS

2008/0059065 A1 3/2008 Strelow et al.
2008/0109184 A1 5/2008 Aratani et al.

FOREIGN PATENT DOCUMENTS

| GB | 2436740 A | 10/2007 |
|----|-----------|---------|
| WO | WO-9735166 A1 | 9/1997 |
| WO | WO-2005100915 A1 | 10/2005 |
| WO | WO-2006002322 A2 | 1/2006 |
| WO | WO-2008/024772 A1 | 2/2008 |

OTHER PUBLICATIONS

Supplementary European Search Report—Apr. 5, 2013—Issued in Connection With Counterpart European Patent Application No. 09851510.9.
PCT/ISA/210—International Search Report—Jun. 30, 2010.
PCT/ISA/237—Written Opinion of the International Searching Authority—Jun. 30, 2010.
David G. Lowe; Computer Science Department University of British Columbia Vancouver, B.C., Canada; "Distinctive Image Feature from Scale-Invariant Keypoints"; pp. 1-28.
Richard Hartley et al; Australian National University, Canberra, Australia, "Multiple View Geometry in Computer Vision", second edition, pp. 364-390, Cambridge University Press 2000, 2003.
D. Katzourakis et al.; "Vision Aided Navigation for Unmanned Helicopters" 17th Mediterranean Conference on Control and Automation, Makedonia Place, Thessaloniki, Greece, Jun. 24-26, 2009.
T. Templeton et al.; "Autonomous Vision-based Landing and Terrain Mapping Using an MPC-controlled Unmanned Rotorcraft"; 2007 IEEE International Conference on Robotics and Automation, Roma, Italy, Apr. 10-14, 2007.

\* cited by examiner

METHOD ESTIMATING ABSOLUTE ORIENTATION OF A VEHICLE

CROSS-REFERENCE TO RELATED APPLICATIONS

This application is the national phase under 35 U.S.C. §371 of PCT/SE2009/000497 filed 20 Nov. 2009.

FIELD OF THE INVENTION

The present invention relates to a method estimating absolute orientation of a vehicle by means of camera and GPS. In this connection GPS stands for a Global Positioning System.

BACKGROUND OF THE INVENTION

In the following the expression absolute orientation refers to how the vehicle is directed relative to a system of axes fixed relative to the ground.

In many application fields it is important to get an accurate estimation of the relative orientation of a vehicle. One such application field is production of maps when images can be taken from airborne vehicles such as unmanned airborne vehicles, often abbreviated UAV. Other application fields are as components in navigation equipments for aeroplanes, helicopters and UAVs or included in missiles such as cruise missiles.

There are quite a number of different ways known to estimate the absolute orientation. One way of doing this is to observe landmarks and compare with a map. It is also possible to combine an inertial motion unit, IMU, that can comprise accelerometers and gyros, with a magneto-meter. Another way is to combine an IMU with a GPS. Examples of rather complex navigation methods using camera, GPS and IMU are known from WO 2005100915 A1, U.S. Pat. No. 5,894,323 A and WO 9735166 A1. Another example is disclosed in US 20060018642 disclosing an infra red camera and GPS used in combination with laser distance measuring and magnetic compass. These by references exemplified methods are component requiring and complex in the treatments of obtained information.

Accordingly, these mentioned methods have different advantages and drawbacks differing in under which circumstances they can be used, the accuracy of the results obtained, time delay introduced and so on.

SUMMARY OF THE INVENTION

The object of the invention is to provide a method estimating absolute orientation requiring few components, namely in principle GPS and camera, so that the costs can be kept down and in addition a method that can be combined with existing navigation methods is available.

The object of the invention is obtained by a method characterized in that the absolute orientation is obtained by the use of absolute position from GPS and relative motion from concurrent images taken above an essentially horizontal ground.

Essential for the invention is that that the vehicle travels above an essentially horizontal ground enabling estimation of the absolute orientation using only a camera and a GPS.

According to a preferred method three concurrent images are used to obtain the absolute orientation. This is the minimum number of images needed to obtain an estimation of the absolute orientation and that at the same time offers an accurate estimation.

According to a still preferred method the following steps are carried out:

1) selecting at least three images at a distance from each other,
2) identifying key points in each selected image,
3) obtaining the absolute positions of the images from the GPS defining the image positions when the respective image was taken, and
4) matching key points between selected images.

Principles for identification of key points are known since long ago and for example we refer to an article of David G Lowe, Computer Science Department University of British Columbia Vancouver, B.C., Canada: "Distinctive Image Feature from Scale-Invariant Keypoints", pp 1-28, Jan. 5, 2004 and in particular to paragraph 2 on page 2 to page 5.

According to a further development of the still preferred method the matching of the key points between the selected images comprises the following steps:

1) projecting the key points down on a horizontal plane for each key point,
2) calculating the geometrical centre of gravity for the corresponding projections equal to the number of images selected,
3) obtaining an error value for each key point and image by the distance between the back projection of the geometric centre of gravity and its respective key point in the image,
4) obtaining the rotation of the images and the height coordinate of the horizontal plane by minimizing the distances according to item 3).

In this connection it can be noticed that such a type of matching per se is previously known from for example an article of Hartley Richard Australian National University Canberra; Australia and Zisserman Andrew University of Oxford, UK: "Multiple View Geometry in Computer Vision, second edition, pp 364-390, Cambridge University Press 2000, 2003. However, according to the invention the matching is applied in a particular application field concerning estimation of absolute orientation of a vehicle. There is no indication to use the matching in such an application field or closely related application fields.

BRIEF DESCRIPTION OF THE DRAWINGS

The invention will now be described in more detail with reference to the accompanying drawings in which.

DETAILED DESCRIPTION OF EMBODIMENTS OF THE INVENTION

Figure 1:
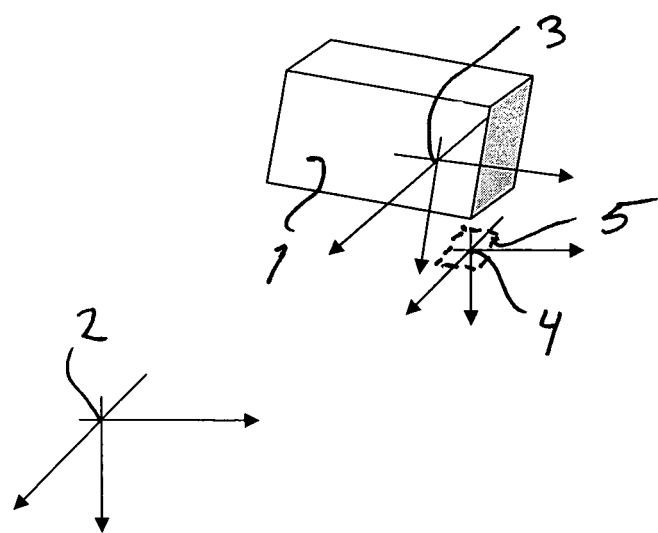
FIG. 1 schematically illustrates reference frames for a vehicle, a camera and horizontal ground.

In FIG. 1 a vehicle 1, such as an unmanned airborne vehicle, airplane, helicopter or missile, is shown moving above an essentially horizontal ground indicated by a reference frame 2 fixed relative to earth. A reference frame 3 is fixed to the vehicle 1 and a reference frame 4 is fixed to a camera 5. Before applying the method according to the invention the following is assumed to be known regarding the reference frames 2, 3 and 4. Concerning the reference frame 2 fixed relative to earth, position and attitude are assumed to be known. Concerning reference frame 3 fixed to the vehicle, position relative to reference frame 2 is assumed to be known. Concerning reference frame 4 fixed to the camera, it is assumed that position and attitude relative to reference frame 3 are known. The part remaining to be estimated by the method according to the invention is to estimate the attitude of reference frame 3 relative to reference frame 2.

Figure 2:
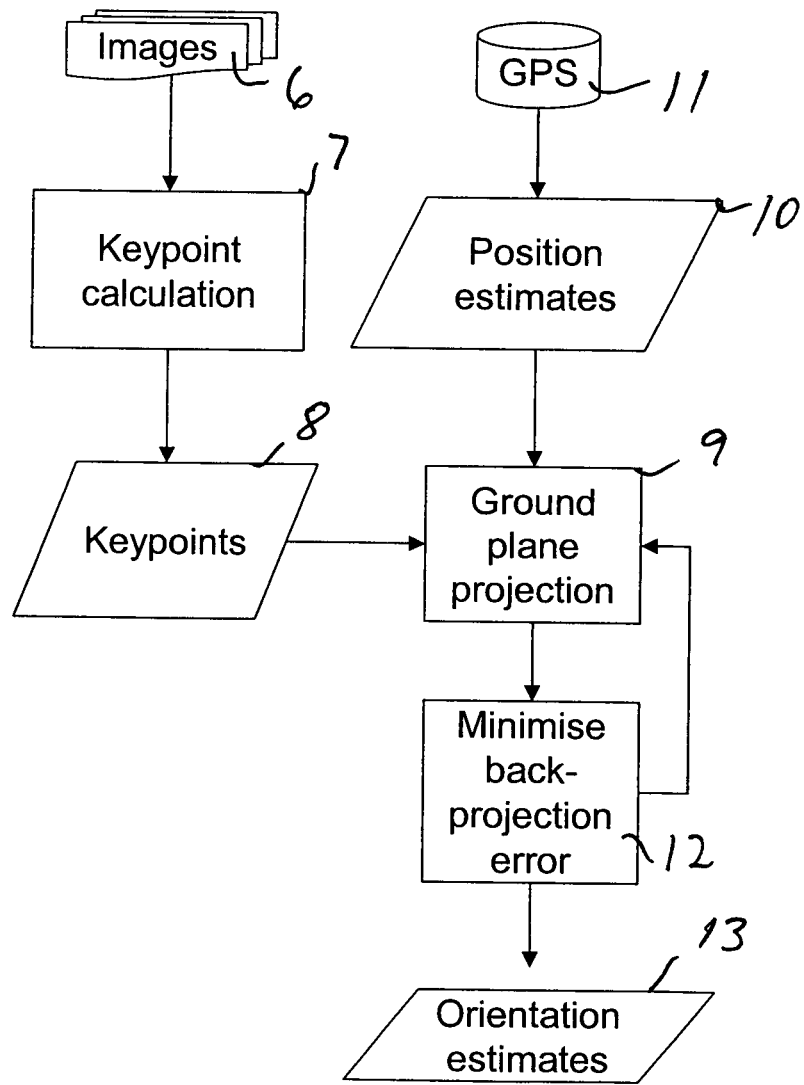
FIG. 2 shows a flow chart illustrating the method according to the invention.

The method according to the invention is now described with reference to the flow chat of FIG. 2.

Based upon images 6 delivered from the camera 5 a key point calculation is carried out in a block 7. This can be done according to known calculation principles as known from the key point reference given above or other similar key point calculation principles. The general principle is to identify key points in the images having particular features. Preferably three images taken at a suitable distance from each other are chosen for this key point process and key points found in all three images are selected. Block 8 comprises selected key points supplied by block 7 and to be projected down to a horizontal ground plane in a block 9. This block 9 is also supplied with position estimates from a block 10 informed from a GPS 11 of the absolute positions, x, y and height, of the images involved in the key point calculations. The position of an image is defined as the position in space where the centre of the camera was located when the image were taken.

In block 9 the key points are projected down on a horizontal plane for each selected key point. Each image defines a position in the horizontal plane for each key point. The position of each key point in space is determined in block 9 by calculating the geometrical centre of gravity for the corresponding projections and equal to the number of images selected. The mutual positions of the key points and the position relative to the image positions are now determined. An error value for each key point and image is obtained by the distance between the back-projection of the geometric centre of gravity and its respective key point in the image. The rotation of the images and the height coordinate of the horizontal plane are determined by minimizing the distances defined in the preceding sentence, block 12 in cooperation with block 9. The minimizing process output orientation estimates, block 13, that in case of key points corresponding to objects essentially on a horizontal ground defines a calculated absolute orientation of the images and when the camera is fixed mounted on or in the vehicle the absolute orientation of the vehicle is also determined.

Accordingly, the proposed method takes advantage of the travelling of a vehicle above horizontal ground. Furthermore the method presuppose that the vehicle is equipped with a fixed mounted calibrated camera synchronized with a GPS receiver so that each taken image can be provided with a GPS-position for the camera at the moment when the photo or image is taken.

The invention is not limited to the method exemplified above but may be modified within the scope of the attached claims.

The invention claimed is:

1. A method estimating absolute orientation of a vehicle, wherein the absolute orientation corresponds to how the vehicle is directed relative to a system of axes fixed relative to the ground consisting of utilization of a fixed mounted calibrated camera synchronized with a GPS receiver, the method consisting of:

selecting at least three images from concurrent images taken above an essentially horizontal ground at a distance from each other, wherein the position of an image is defined as the position in space where the center of the camera was located when the image was taken;

identifying key points in each selected image;

obtaining absolute positions of the images from the GPS defining the image positions when a respective image was taken; and matching key points between selected images to obtain an estimate of the absolute orientation.

2. A method estimating absolute orientation of a vehicle, wherein the absolute orientation corresponds to how the vehicle is directed relative to a system of axes fixed relative to the ground consisting of utilization of a fixed mounted calibrated camera synchronized with a GPS receiver so that each taken image can be provided with a GPS-position for the camera at the moment when the photo or image is taken, the method consisting of:

selecting at least three images from concurrent images taken above an essentially horizontal ground at a distance from each other, wherein the position of an image is defined as the position in space where the center of the camera was located when the image was taken;

identifying key points in each selected image;

obtaining absolute positions of the images from the GPS defining the image positions when a respective image was taken; and matching key points between selected images to obtain an estimate of the absolute orientation.

* * * * *